(12) United States Patent
Lee

(10) Patent No.: US 6,169,535 B1
(45) Date of Patent: *Jan. 2, 2001

(54) MONITOR ADJUSTMENT CONTROL

(75) Inventor: Charles Lee, Simi Valley, CA (US)

(73) Assignee: Toshiba America Information Systems, Inc., Irvine, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/902,240

(22) Filed: Jul. 29, 1997

Related U.S. Application Data

(60) Provisional application No. 60/051,288, filed on Jun. 30, 1997.

(51) Int. Cl.[7] ............................................. G09G 5/08
(52) U.S. Cl. ........................... 345/145; 345/127; 345/204
(58) Field of Search ............................... 345/204, 145, 345/146, 156, 157, 121, 127, 904, 123, 342

(56) References Cited

U.S. PATENT DOCUMENTS

| | | |
|---|---|---|
| 4,991,023 | 2/1991 | Nicols . |
| 5,270,821 | 12/1993 | Samuels . |
| 5,448,697 | 9/1995 | Parks et al. . |
| 5,477,241 | 12/1995 | Higgins et al. . |
| 5,481,276 | 1/1996 | Dickey et al. . |
| 5,483,260 | 1/1996 | Parks et al. . |
| 5,499,040 | 3/1996 | McLaughlin et al. . |
| 5,550,556 | 8/1996 | Wu et al. . |
| 5,565,897 | 10/1996 | Kikinis et al. . |
| 5,570,108 | 10/1996 | McLaughlin et al. . |

OTHER PUBLICATIONS

Print out of Graphical User Interface of "Display Manager" Computer Access Technology Corp., Santa Clara, CA, 1997.

Print out of Graphical User Interface of "CustoMax" Philips Electronics N.V. (1994).

Print out of Graphical User Interface of, and User's Manual for, "Monitor Soft Control" Multivideo Labs, Inc., Princeton, NJ.

*Primary Examiner*—Kent Chang
(74) *Attorney, Agent, or Firm*—Pillsbury Madison & Sutro LLP

(57) ABSTRACT

The described embodiments are directed to a method and apparatus for adjusting a display through user inputs from a graphical user interface. In particular, the described embodiments are directed to such a graphical user interface including a display which illuminates a figure representative of the cumulative adjustments made to the display. A computer system including a video monitor having a CRT and display control circuitry disposed therein. The control circuitry is capable of maintaining at least one adjustment state of a display illuminated by the CRT. The computer system includes a host processor which is capable of transmitting display adjustment signals to the control circuitry to change the at least one adjustment state. Upon a user selection, the display of the CRT illuminates an adjustment display including a single graphical image which is representative of the cumulative adjustments made to the display. A pointer allows a user to move a cursor in the adjustment display to click on and drag edges of the single graphical image to effectuate adjustments to the display. The host processor executes control routines to initiate the transmission of adjustment signals to the control circuitry to change the at least one adjustment state in response to user provided pointer movements for dragging edges of the single graphical image.

13 Claims, 4 Drawing Sheets

MONITOR ADJUSTMENT CONTROL

This application claims the benefit of U.S. Provisional Application No. 60/051,288, filed Jun. 30, 1997.

BACKGROUND OF THE INVENTION

1. Field of the Invention

The described embodiments are directed to a method and apparatus for adjusting a display through user inputs from a graphical user interface. In particular, the described embodiments are directed to such a graphical user interface including a display which illuminates a figure for making adjustments made to the display.

2. Related Art

Conventional computer monitors typically have built-in control inputs for things such as brightness, contrast, picture position, and sizing. These control inputs as described above require the user to reach to the monitor, sometimes to different locations around the case, to find the proper control. Moreover, the control inputs do not necessarily show the adjustment limits or the present position of the particular adjustable attribute. Additionally, a new monitor installed in a computer system typically requires adjustment of the monitor controls. When a new monitor is installed, it is not unusual for the initial display on the monitor to be off-center, skewed, and the like. Thus, the set-up procedures must provide for adjustments to the monitor so that the picture may be properly adjusted initially.

A computer system typically includes a host computer coupled to a monitor. Newer computer systems permit the user to make inputs to the host unit of the computer through peripheral devices such as a keyboard or pointing device (such as a mouse) to make adjustments to the monitor. In response to these user inputs, the host computer may transmit adjustment control signals interleaved with video signals to control circuitry in the monitor. Thus, the need for external control inputs on the monitor is eliminated.

Some systems, supported by Windows or a Macintosh operating system, provide graphical user interfaces (GUIs) which has somewhat simplified the inputting of adjustment information through a pointer controlled cursor. The "CustoMax" system sold by Philips Electronics displays several cursor selectable buttons for receiving adjustment information. The "Display Manager" system sold by Computer Access Technology Corp. displays a draggable lever for inputting adjustments for a selected characteristic. A graphical shape represents the adjustments to the display made during a current adjustment session for the selected characteristic. The "Monitor Soft Control" system sold by Multi-Video Labs, Inc. generates a separate selectable display for receiving inputs for each display characteristic. Each selectable display includes its own draggable lever for receiving adjustment inputs for the selected characteristic and its own gauge for showing the adjustments made during the current adjustment session. U.S. Pat. No. 5,565,897 assigned to Elonex Technologies, Inc. describes multiple shapes which are calibrated to appear rectangular on a properly adjusted monitor. The user may click on and drag portions of the multiple shapes to initiate the transmission of display adjustment signals. When the multiple shapes are not rectangular, the user may click on and drag portions of the multiple shapes until they are rectangular, thus putting the monitor in its properly adjusted state.

The current GUI based systems for receiving and displaying input adjustments are complex and employ multiple images to correspond with different adjustable display characteristics. The control circuitry typically includes control parameters which have an initial state which is adjustable in response to signals from the host. Each monitor in a line of monitors typically includes control circuitry from the same manufacturer having control parameters at the same initial state. The control circuitry integrated into each monitor is then typically adjusted by the same degree to properly adjust the monitor to a predetermined state at the factory. For monitors having been shipped from the factory, the current GUI based systems, showing only the adjustments made in a current adjustment session, do not easily allow a technician to readjust such a monitor to its original factory adjustment state.

SUMMARY OF THE INVENTION

An object of an embodiment of the present invention is to provide a method and apparatus for adjusting a display through a graphical user interface.

Another object of an embodiment of the present invention is to provide a simplified method and apparatus for adjusting a display to initial factory adjustment values.

Another object of an embodiment of the present invention is to provide a graphical image illuminated on a display which represents the cumulative adjustments made to the display.

Another object of an embodiment of the present invention is to provide a single graphical image illuminated on a display having a size, shape and orientation which is representative of the cumulative adjustments made to the display.

Briefly, an embodiment of the present invention is directed to a computer system including a video monitor having a CRT and display control circuitry disposed therein. The control circuitry is capable of maintaining at least one adjustment state of a display illuminated by the CRT. The computer system includes a host processor which is capable of transmitting display adjustment signals to the control circuitry to change the at least one adjustment state. Upon a user selection, the display of the CRT illuminates an adjustment display including a single graphical image which is representative of the cumulative adjustments made to the display. A pointer allows a user to move a cursor in the adjustment display to click on and drag edges of the single graphical image to effectuate adjustments to the display. The host processor executes control routines to initiate the transmission of adjustment signals to the control circuitry to change the at least one adjustment state in response to user provided pointer movements for dragging edges of the single graphical image.

By using a single graphical image for receiving user inputs to adjust multiple characteristics of the display, and representing the cumulative adjustments in the multiple characteristics by the size, shape and orientation of the graphical image, the described embodiments provide a consistent procedure for making the adjustments and recording the cumulative adjustments made. Thus, a technician can easily adjust a display according to its initial factory adjustment states as represented by the graphical image.

DETAILED DESCRIPTION

Embodiments of the present invention are directed to a method and apparatus for interactively adjusting an electronic display which is adjustable for the effects of rotation, size, parallelism, centering, trapezoidism, bowing, and symmetry. The display portion shows a single graphical image, which provides a graphical gauge, and a cursor which is movable in response to pointer movements. The single graphical image includes edges which are draggable in response to cursor movements to receive inputs to adjust the display. The size, position, shape and orientation of the single graphical image preferably reflect the cumulative adjustments made to the display.

An embodiment of the present invention includes a computer system with a monitor having a cathode ray tube (CRT) disposed therein and a host unit coupled to the monitor. The monitor includes control circuitry with several alterable parameters which define one or more adjustment characteristics directed to display rotation, size, parallelism, centering, trapezoidism, bowing, or symmetry. The host unit preferably includes, or is coupled to, a pointing device (such as a mouse, track ball, joy stick, or pen digitizer, etc.) for controlling the movement of a cursor illuminated in the display. A real time display illuminated in the CRT and software routines executing on a CPU of the host unit used in conjunction with the pointing device provide a graphical user interface (GUI) permitting the user to make inputs to the host unit by clicking on and dragging features of the illuminated display.

Figure 1:
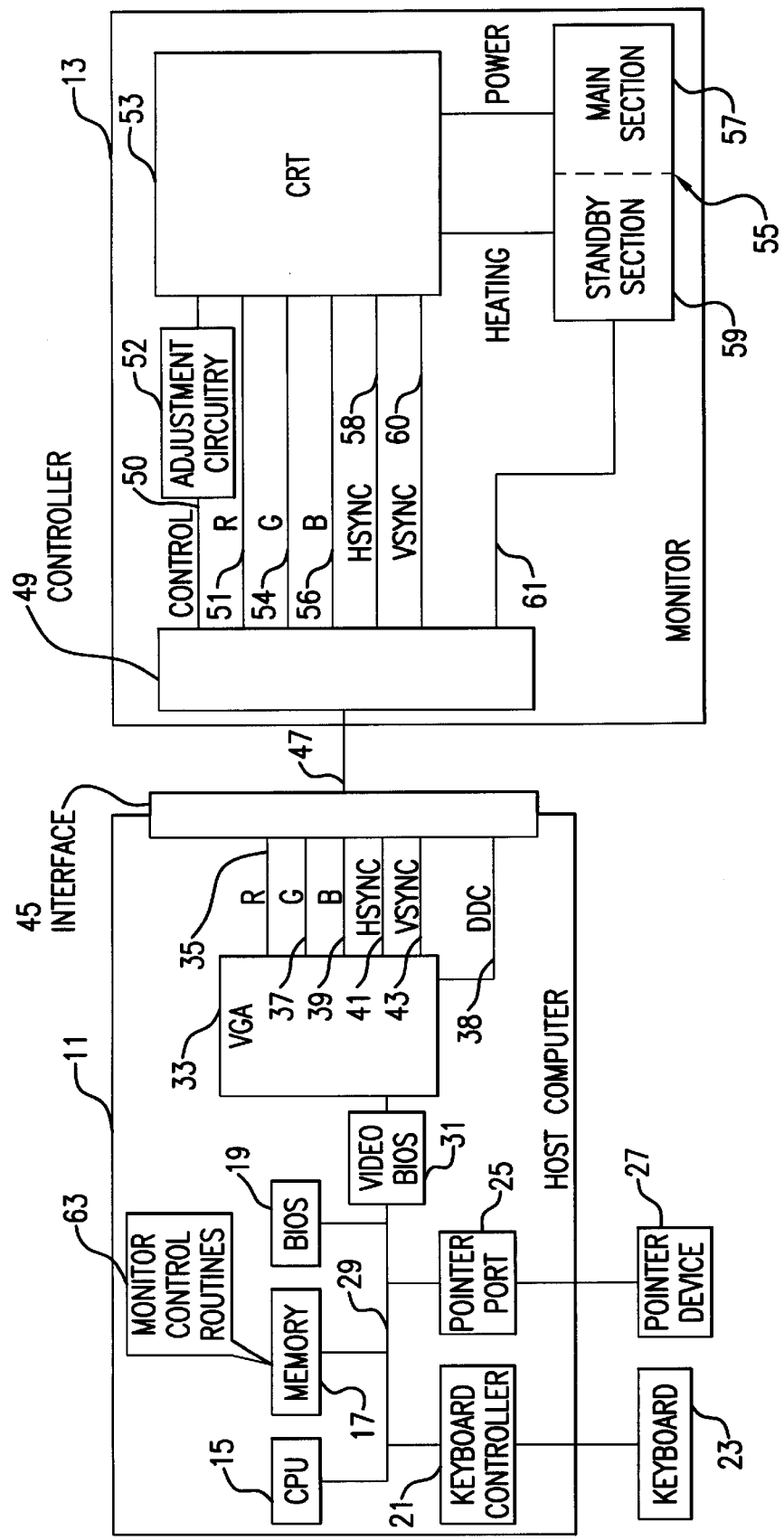
FIG. 1 shows a block diagram of a host computer system connected to a CRT monitor, including remote control of display functions according to an embodiment of the present invention.

FIG. 1 is a simplified block diagram of a host computer 11 connected to a CRT-type monitor 13, providing remote control of display functions on the monitor 13 according to an embodiment of the present invention. The host computer 11 comprises a CPU 15 for managing computer functions, executing logic, and performing computations; a memory 17, typically a random access memory (RAM) and hard disk for storing control routines and data; a basic input/output system (BIOS) 19; a keyboard controller 21 coupled to a keyboard 23; and a pointer port 25 coupled to a pointer device 27, which may be a track ball, mouse, pen digitizer, or other types of pointer devices capable of moving a cursor illuminated in the monitor 13. The elements described above are bus connected by one or more bus structures represented by interconnecting bus 29 which also connects to video circuitry 33 through a video BIOS 31.

It is well known in the art that there are many variations in the architecture shown for the host computer system of FIG. 1 and the architecture is meant to be representative of conventional architecture in general. There are, similarly, many alternatives for the particular functional elements shown. For example, FIG. 1 illustrates a keyboard 23 as an input device. There are alternatives for input devices, such as touch screens, pen pads, and the like, and such alternatives may be used in other embodiments of the invention. There are similarly several alternatives for pointer devices in addition to the ones listed above.

In the embodiment of FIG. 1, video circuitry is a VGA subsystem 33, which provides video dot data for a monitor such as R, G, and B signals, 35, 37, and 39, and also horizontal synchronization (HSYNC) signals 41 and vertical synchronization (VSYNC) signals 43, to a cable interface 45. These signals and ground connections are coupled to the monitor 13 conventionally by a VGA cable 47, wherein the signals are coupled to separate conductors.

According to an embodiment, the host computer 11 may transmit data to adjustment circuitry 52 of the monitor 13 through the VGA cable 47 by inserting serial data packets between pulses of the VSYNC signals 43 as described in detail in U.S. Pat. No. 5,565,897 assigned to Elonex Technologies, Inc. at Col. 4, line 23 through Col. 7, line 8. In another embodiment, the host computer 11 may transmit control signals to the adjustment circuitry 52 by using a code to modulate the pulse width of the VSYNC pulse as described in detail in U.S. Pat. No. 5,550,556 assigned to MultiVideo Labs, Inc. at Col. 2, line 50 through Col. 15, line 17. In another embodiment, the VGA subsystem 33 provides a Display Data Channel (DDC) line 38 to the interface 45, allowing the transmission of signals to the adjustment circuitry 52 independent of the transmission of video signals. The DDC line 38 also enables bidirectional communication with the monitor 13. Thus, the monitor 13 may transmit signals to the host computer 11 to inform the host computer 11 of the current adjustment state of the monitor 13. The present invention is not limited to systems which transmit signals to the monitor 13 using these techniques as there are several conventional ways to transmit such information.

The adjustment circuitry 52 may include a MultiVideo Labs, Inc., chipset model number 82C610 which is bundled with appropriate control software to be loaded in the memory 17 and executed on the CPU 15. This control software facilitates the transmission of control signals from the host computer 11 to the adjustment circuitry 52 in the monitor 13 by encoding the adjustment signals in the signals which transmit video dot data.

Figure 2:
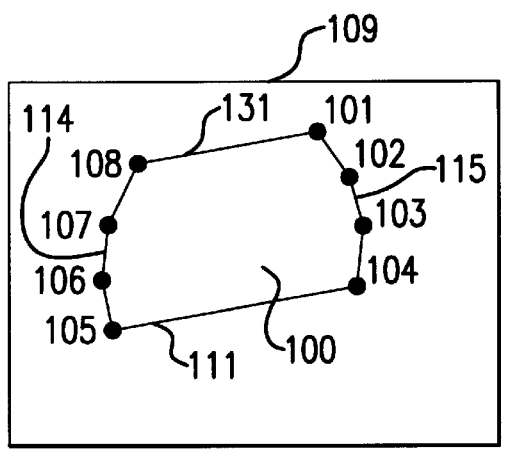
FIG. 2 shows a graphical image illuminated on a display which has a size, shape, and orientation which is representative of the cumulative adjustments made to the display according to the embodiment of FIG. 1.

According to an embodiment of the present invention, the user may provide adjustment inputs to the adjustment circuitry 52 from a GUI provided by the pointer device 27 used in conjunction with a single graphical image 100 displayed on the monitor 13, providing a graphical gauge as shown in FIG. 2. This GUI may be provided by software written for a Windows or Macintosh operating system, or some other operating system supporting programs which generate displays with cursor selectable icons for receiving user inputs. For the Windows embodiments, the software is preferably written in Visual C and has an interface with the control software bundled with the adjustment circuitry 52 to permit the user to provide inputs to the routines of the control software via the GUI. The user may initiate a signal from the host to the CRT monitor to change the screen control parameters to thereby adjust the display size, position, rotation, horizontal bowing, symmetry, parallelism, or trapezoidal effects as discussed below in conjunction with FIGS. 3a through 9.

FIG. 2 shows a graphical image 100 for the CRT monitor adjustment. The graphical image 100 is a single shape in a rectangular region 109. The graphical image 100 is preferably a solid image or a simple closed curve. The graphical image 100 includes a left edge 114 and a right edge 115 having a set of points 101 through 108 which the user may click on and drag to provide the desired adjustment inputs. The rectangular region 109 may be located anywhere on the screen and preferably has dimensions proportional to those of the screen size. The rectangular region 109 may be as large as the screen and is preferably at least as large as one seventh the screen in either dimension to allow reasonable movement for the graphical image 100.

The eight points 101 through 108 partition the edges 114 and 115 into thirds, approximately. The user may use the pointer device 27 to individually click on and drag the points 101 through 108 (or the edges as described below) to send control signals to the monitor 13 to incrementally adjust the control parameters in the adjustment circuitry 52. The movement of these points 101 through 108 may change the size, position, orientation and shape of the graphical image 100 in the rectangular region 109. The shape of the graphical image 100 is obtained by connecting the points 101 through 108 with segments. A top segment (or edge) 131 (between points 101 and 108) preferably remains parallel to a bottom segment (or edge) 111 (between points 104 and 105). Thus, the resulting size, position, orientation and shape of the image 100 after the adjustments represent the cumulative adjustments made to the adjustment circuitry 52.

The graphical image 100, as depicted in FIG. 2, shows that adjustments for position, rotation, bowing ("pincushion"), parallelism and trapezoidal effects have been made. For simplicity in illustrating the individual adjustments for each of these alterable parameters, FIGS. 3a through 9 do not each show that cumulative adjustments have been made for all of these alterable parameters. However, as will be explained in greater detail below, the user can consistently make adjustments or examine cumulative adjustments for any particular alterable parameter independent of any prior adjustment to any other alterable parameter.

In one embodiment, the user may select a particular characteristic to be adjusted by selecting an appropriate icon (not shown) in the display in a first mode. Thus, the display may illuminate a cursor selectable icon for each of size, position, rotation, pincushion, symmetry, parallelism, and trapezoidal effects. In a second mode, as described in greater detail below in connection with FIGS. 3a through 9, the user can move the cursor in the display to a particular region to select the desired type of adjustment to be made. The shape and/or color of the cursor then preferably changes to indicate the corresponding selected type of adjustment.

Pointer movements from the pointer device 27 are interpreted in a manner consistent with the selected mode. In the first mode, pointer movements can only initiate adjustments for the selected adjustment characteristic. In the second mode, adjustments can be made for different adjustment characteristics by moving the cursor to a designated spot or activation region. The user may then click on the spot or click on and drag the spot to make the selected adjustment while the corresponding visual characteristic of the graphical image 100 changes accordingly.

Figure 3A:
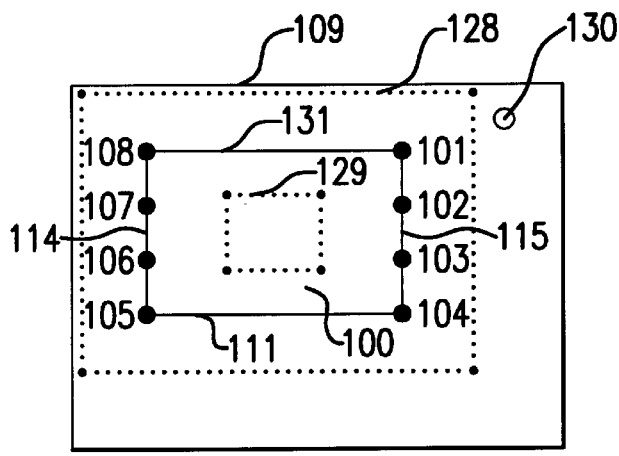
FIGS. 3a, 3b and 3c illustrate how a user adjusts the size of the display through the graphical image illuminated thereon, and how the graphical image represents such cumulative size adjustments.
Figure 3B:
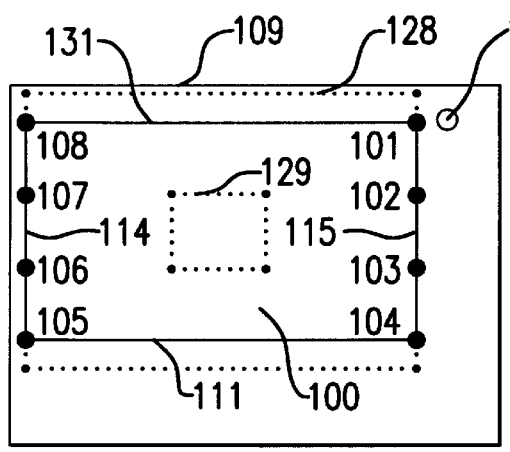
Figure 3C:
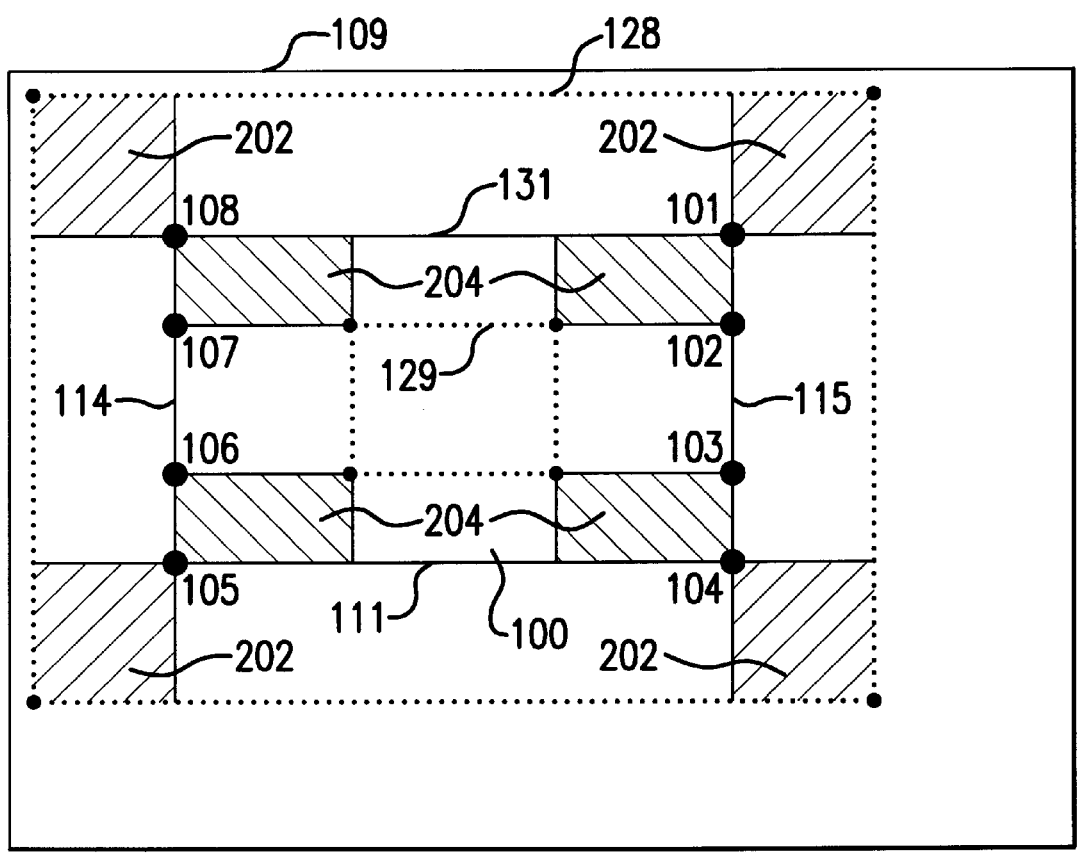

FIGS. 3a and 3b illustrate the size adjustment which follows selection of the appropriate icon with the pointer device 27 in the first mode. FIG. 3c illustrates the size adjustment as selected by moving the cursor to a particular region of the rectangular region 109 in the second mode, causing the cursor to change its shape and/or color to indicate that a size adjustment has been selected. Unlike in FIG. 2, FIGS. 3a, 3b and 3c show the graphical image 100 as being rectangular and upright (i.e., the top segment 131 and bottom segment are horizontal) in the rectangular region 109, indicating that no adjustments have been made to adjust rotation, symmetry, bowing, parallelism or trapezoidism. The resulting size of the display is defined by a width and a height. The dotted rectangles 129 and 128 define the minimum and maximum limits for size adjustment, respectively. Thus, the width and height of the rectangles 128 and 129 preferably correspond with extreme size adjustment limits of the adjustment circuitry 52. These rectangles 128 and 129, and the graphical image 100 are preferably concentric. The length of the bottom segment 111 represents the cumulative width adjustment of the display. The perpendicular distance between the top segment 131 and the bottom segment 111 represents the cumulative height adjustment to the display.

FIGS. 3a and 3b illustrate an adjustment for increasing the size of the monitor screen. In FIG. 3b, the width of the display is increased to approach the maximum width provided by the adjustment circuitry 52. In the first mode, the user may click on and drag point 104 to the right until the right edge 115 meets the right border of the rectangle 128, or click on and drag point 105 to the left until the left edge 114 meets the right border the rectangle 128. As the graphical image 100 and rectangles 128 and 129 are concentric in the preferred embodiment, moving the left edge 114 inward or outward causes the right edge 115 to move inward in a corresponding manner. The user can similarly adjust the height of the display by clicking on and dragging any of the corner points 101, 104, 105 or 108 to move the top segment 131 and the bottom segment 111 inward or outward.

Alternatively, in the first mode the user may move the cursor to a spot such as the circle 130 (i.e., a location which is not on a point or segment of the graphical image 100) and then click on the pointer device 27 to move the nearest point of the graphical image 100 (point 101 in this case) to the cursor at the circle 130 (or as close as possible within the limits of the rectangle 128), thus enlarging the graphical image 100. Similarly, the user may move the cursor to a location within the graphical image 100 (not shown) and then click on the pointer device 27 to move the point on the graphical image 100 which is nearest to the cursor to the location of the cursor (or as close as possible while remaining outside of the rectangle 129) to shrink the graphical image 100. Also, the user may move the cursor to a point which is close to one of the sides of the graphical image (i.e., top segment 131, bottom segment 111, left edge 114 or right edge 115) yet distant from any of the corner points (i.e., points 101, 104, 105 or 108) and click on the pointer device 27 to move the side to the cursor (or as close as possible within the limits of the rectangles 128 and 129). This causes an adjustment in only one size dimension (i.e., height or width) while making no changes to the other size dimension.

As shown in FIG. 3c, size adjustments in the second mode are made by merely moving the cursor in one of the regions 202 or 204 which are each located about one of the corner points 101, 104, 105 or 108. The user moves the cursor to one of the regions 204 inside of the graphical image 100 to shrink the size of the graphical image or moves the cursor to one of the regions 202 outside of the graphical image 100 to enlarge the graphical image 100. The regions 202 are preferably within the rectangle 128 and the regions 204 are preferably outside of the rectangle 129 to reflect the limits in the size adjustment. When the cursor is in one of the regions 202 or 204, the cursor preferably changes shape and/or color to indicate to the user that a size adjustment is being selected. The user then clicks on the pointer device 27 to move the corresponding corner point to the cursor to change the size of the graphical image 100 and transmit the control signal to the monitor 13 to make the corresponding size adjustment.

Figure 4:
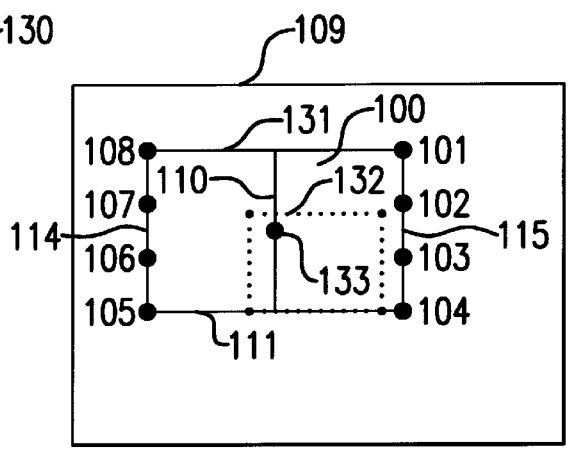
FIG. 4 illustrates how a user adjusts the location of the display through the graphical image illuminated thereon, and how the graphical image represents such cumulative location adjustments.

FIG. 4 illustrates the position adjustment which follows selection of the appropriate icon with the pointer device 27 (first mode) or by moving the cursor to be within a region bordered by a dotted rectangle 132 (second mode). Unlike in FIG. 2, FIG. 4 shows the graphical image 100 as being rectangular (indicating that no adjustment has been made for the effects of horizontal symmetry, horizontal bowing, parallelism or trapezoidism) and upright in the rectangular region 109 (i.e., the top segment 131 and bottom segment 111 are horizontal, indicating that no adjustments have been made to adjust rotation, symmetry, bowing, parallelism or trapezoidism). Upon selection of this adjustment in the first mode, a circle 133 may appear in this region on a perpendicular bisector 110 which is preferably at about the center of the graphical image 100. The dotted rectangle 132 may also appear upon selection of this adjustment. The user may adjust the position of the display by clicking on and dragging a spot within the restricted region bordered by the dotted rectangle 132. Alternatively, the user may click on and drag the circle to a desired location within the dotted rectangle 132.

In the second mode, the user selects the position adjustment by merely moving the cursor to a location within the dotted rectangle 132 to cause the circle 133 to appear and the color and/or shape of the cursor to change to indicate selection of the position adjustment. The dotted rectangle 132 may also appear in response to moving the cursor to this region. The user then clicks on the pointer device 27 to cause the circle 133 to move to the location of the cursor, thus shifting the entire graphical image 100 by a corresponding amount to indicate the changes in the adjustment of the monitor 13.

The dotted rectangle 132 preferably reflects a restricted region which limits the movement of the graphical image 100 to about ten percent of the rectangular region 109 to prevent the movement of the graphical image 100 off of the rectangular region 109. Thus, the position of the circle 133 represents cumulative position adjustment. As shown in FIG. 4, the circle 133 has been moved to center the display close to the top and left so as to set the corresponding parameters of the adjustment circuitry 52 close to their limits.

Figure 5:
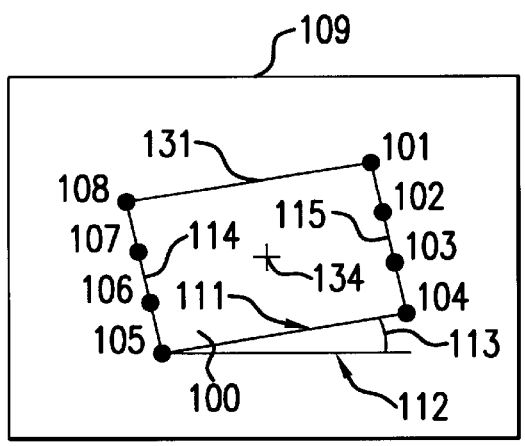
FIG. 5 illustrates how a user adjusts the rotational orientation of the display through the graphical image illuminated thereon, and how the graphical image represents such cumulative rotational adjustments.

FIG. 5 illustrates the rotation adjustment which follows the selection of the appropriate icon with the pointer device 27 (first mode), or by moving the cursor to the segment connecting points 101 and 102 or the segment connecting points 107 and 108 (second mode), causing the cursor to change its shape and/or color. Of course, other segments may be chosen to initiate the rotational adjustment in the second mode. Unlike in FIG. 2, FIG. 5 shows the graphical image 100 as being rectangular in the rectangular region 109, indicating that no adjustments have been made to adjust symmetry, bowing, parallelism or trapezoidism.

In the first mode, the user may click on and drag any of the points 101 through 108 to rotate the graphical image 100 about its center 134 to initiate signals to adjust the rotational orientation of the display in the parameters of the adjustment circuitry 52. In the second mode, the user may click on and drag the segment connecting points 101 and 102 or the segment connecting points 107 and 108 to rotate the graphical image 100 about the center 134. An angle 113 between the bottom segment 111 and the horizontal axis 112 represents the cumulative rotational adjustments made to the adjustment circuitry 52. Such cumulative rotational adjustments are preferably limited to ten degrees in the clockwise or counter-clockwise directions.

Figure 6:
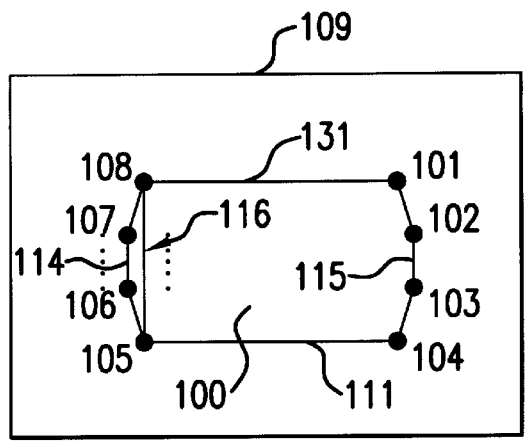
FIG. 6 illustrates how a user adjusts the horizontal bowing or pincushion effects of the display through the graphical image illuminated thereon, and how the graphical image represents such cumulative horizontal bowing adjustments.

FIG. 6 illustrates the horizontal bowing or "pincushion" adjustment which follows the selection of the appropriate icon with the pointer device 27 (first mode), or by moving the cursor to the segment connecting points 102 and 103 (second mode), causing the cursor to change its shape and/or color. Unlike in FIG. 2, FIG. 6 shows the graphical image 100 as being upright in the rectangular region 109 (i.e., top segment 131 and bottom segment 111 are horizontal, indicating that no adjustments have been made for rotational alignment), and having top and bottom segments 131 and 111 having the same length and aligned (indicating that no adjustments have been made to correct parallelism or trapezoidism). The left edge 114 and the right edge 115 curve inward or outward together. In the first mode, the user may initiate signals to the adjustment circuitry 52 to adjust the horizontal bowing effect by either clicking on and dragging points 102 or 103 (or the segment connecting these points) to move the right edge 115, or clicking on and dragging points 106 or 107 (or the segment connecting these points) to move the left edge 114. As a result, the left edge 114 and the right edge 115 curve toward or away from each other to represent the horizontal bowing adjustment while points 101, 104, 105, and 108 remain stationary. In the second mode, the user clicks on and drags the segment connecting points 102 and 103 to move the edges 114 and 115 to curve inward or outward together.

The dotted lines show the allowable extent for the shift if the user is clicking on and dragging the left edge 114 to make the adjustment. The extent of the bowing in the left edge 114 is centered about the reference edge 116 between points 105 and 108. The deviation of the left edge 114 from the reference edge 116, in conjunction with the deviation of the right edge 115 from a corresponding reference edge (not shown), represents the cumulative adjustment as discussed in greater detail below. In another embodiment (not shown), additional points are disposed on the top and bottom edges 111 and 131 to permit the user to make similar adjustments for bowing in the vertical direction by clicking on and dragging the top edge 131 or the bottom edge 111.

Figure 7:
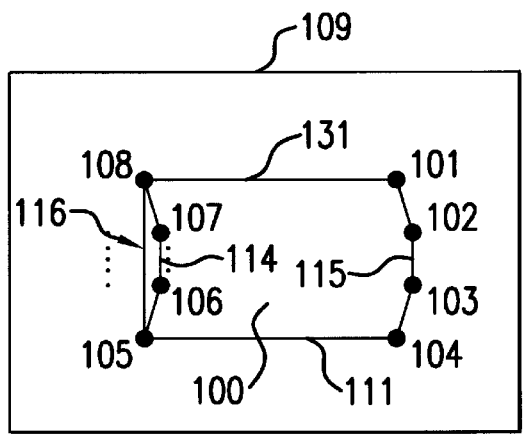
FIG. 7 illustrates how a user adjusts the horizontal symmetry effects of the display through the graphical image illuminated thereon, and how the graphical image represents such cumulative horizontal symmetry adjustments.

FIG. 7 illustrates the horizontal symmetry adjustment which follows the selection of the appropriate icon with the pointer device 27 (first mode), or by moving the cursor to the segment connecting points 106 and 107 (second mode), causing the cursor to change its shape and/or color. Unlike in FIG. 2, FIG. 7 shows the graphical image 100 as being upright in the rectangular region 109 (indicating that no adjustments have been made for rotational alignment), and having top and bottom segments 131 and 111 having the same length and aligned (indicating that no adjustments have been made to correct parallelism or trapezoidism). The left edge 114 and the right edge 115 move together to the left or the right. In the first mode, the user may initiate signals to the adjustment circuitry 52 to adjust the horizontal symmetry effect by either clicking on and dragging points 102 or 103 (or the segment connecting these points) to move the right edge 115, or clicking on and dragging points 106 or 107 (or the segment connecting these points) to move the left edge 114. In the second mode, the user clicks on and drags the segment connecting points 107 and 108 to cause the edges 114 and 115 to curve to the left or right together while points 101, 104, 105, and 108 remain stationary. As a result, the left edge 114 and the right edge 115 move together to the left or right to represent the horizontal symmetry adjustment.

The dotted lines show the allowable extent for the shift if the user is moving the left edge 114 to make the adjustment. The extent of the bowing in the left edge 114 is centered about the reference segment 116 between points 105 and 108. The deviation of the left edge 114 from the reference segment 116, in conjunction with the deviation of the right edge 115 from its corresponding reference edge, represents the cumulative adjustment as discussed in greater detail below. In another embodiment (not shown), additional points are disposed on the top and bottom segments 111 and 131 to permit the user to make similar adjustments for symmetry in the vertical direction by clicking on and dragging the top segment 131 or the bottom segment 111.

In both the horizontal bowing and symmetry adjustments illustrated in FIGS. 6 and 7, the left segment 114 and right segment 115 preferably have an adjustment range which is about 30% of the difference between the maximum and minimum widths for size adjustment (FIGS. 3a and 3b). This allows an inward or outward deviation of the left segment 114 from the reference segment 116 of about 15% of this difference. As discussed above, both symmetry and bowing adjustments affect the curvature of the edges 114 and 115. The shapes of these edges preferably represent the combined effect of the cumulative symmetry and bowing adjustments. By noting the leftward or rightward deviations of each of the left edge 114 and the right edge 115 from respective reference segments (the reference segment corresponding to the left edge 114 is reference segment 116 and the reference segment corresponding to the right edge 115 is not shown), the cumulative adjustment effect solely due to horizontal symmetry adjustments is represented as half the sum of the deviations. The effect solely due to horizontal bowing adjustments is represented as half of the difference between the leftward or rightward deviations of the left edge 114 and the deviations of the right edge 115.

FIG. 6, for example, shows that the left edge 114 and the right edge 115 are curved outward by the same amount. Adding a value corresponding to the leftward deviation the left edge 114 (arbitrarily a positive value) to a value corresponding to the rightward deviation of the right edge 115 (correspondingly a negative value having a magnitude equaling the value associated with the leftward deviation of the left edge 114) results in zero, indicating no cumulative adjustment for horizontal symmetry. Subtracting these values provides a result equal to double the value representing the leftward deviation of the left edge 114, indicating a corresponding cumulative adjustment for horizontal bowing effects.

FIG. 7, on the other hand, shows that the left edge 114 and the right edge 115 are each curved to the right by the same amount. Thus, adding the values corresponding to each of the rightward deviations of the left edge 114 and the right edge 115 provides a value equal to double the value corresponding to the rightward deviation of the left edge 114, indicating a corresponding cumulative adjustment for horizontal symmetry. Subtracting these values provides a result equal to zero, indicating no cumulative adjustment for horizontal bowing.

Figure 8:
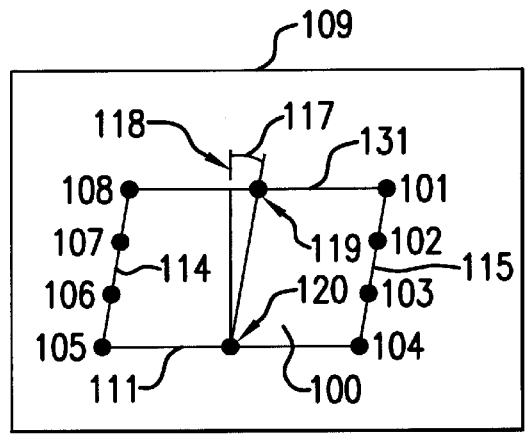
FIG. 8 illustrates how a user adjusts the parallelism effects of the display through the graphical image illuminated thereon, and how the graphical image represents such cumulative parallelism adjustments.

FIG. 8 illustrates the parallelism adjustment which follows the selection of the appropriate icon with the pointer device 27 (first mode), or by moving the cursor to about the middle of the top segment 131 (second mode), causing the cursor to change its color and/or shape to indicate selection of the parallelism adjustment. Unlike in FIG. 2, FIG. 8 shows the graphical image 100 as being upright in the rectangular region 109 (indicating that no adjustments have been made for rotational alignment), having top and bottom segments 131 and 111 with the same length (indicating that no adjustments have been made to correct trapezoidism), and having straight left and right segments 114 and 115 (indicating that no adjustments have been made for horizontal symmetry or bowing).

In the first mode, the user may initiate parallelism adjustment signals to the adjustment circuitry 52 by clicking on and dragging either point 101 or point 108 to shift the top segment 131 in a direction substantially parallel to the bottom segment 111 while the bottom segment 111 remains stationary. In the second mode, the user clicks on the pointer device 27 at about the middle of the top segment 131 and drags the top segment 131 to the left or right while the bottom segment 111 remains stationary. The cumulative adjustment is represented by the angle 117 between the vertical axis 118 and the line passing through the midpoints 119 and 120 of the top segment 131 and the bottom segment 111. The limits for the tilt are preferably about fifteen degrees in a clockwise or counter-clockwise direction.

Figure 9:
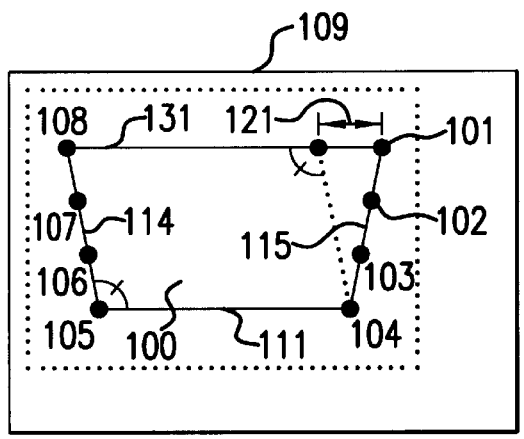
FIG. 9 illustrates how a user adjusts the trapezoidal effects of the display through the graphical image illuminated thereon, and how the graphical image represents such cumulative trapezoidal adjustments.

FIG. 9 illustrates the trapezoidal adjustment which follows the selection of the appropriate icon with the pointer device 27 (first mode), or by moving the cursor to a leftmost or rightmost portion of the top segment 131 (second mode), causing the cursor to change its color and/or shape to indicate selection of the trapezoidal adjustment. Unlike in FIG. 2, FIG. 9 shows the graphical image 100 as upright in the rectangular region 109 (i.e., having top and bottom segments 131 and 111 which are horizontal in the rectangular region 109, indicating that no adjustments have been made for rotational alignment), having left and right edges 114 and 115 which are straight (indicating that no adjustments have been made for horizontal bowing or symmetry), and having the bottom segment 111 centered within the top segment 131 (indicating that no adjustments have been made to correct parallelism).

In the first mode, the user may initiate the transmission of trapezoidal adjustment signals to the adjustment circuitry 52 by clicking on and dragging either point 101 or 108 to stretch or compress the top segment 131 horizontally. The points 101 and 108 move inward and outward together to shorten or lengthen the top segment 131 while points 104 and 105 remain stationary. In the second mode, the user may click on and drag the aforementioned leftmost or rightmost portion of the top segment 131 to move the points 101 and 108 inward and outward together to shorten or lengthen the top segment 131 while points 104 and 105 remain stationary. The cumulative adjustment is represented by the ratio of the difference 121 between the length of the top segment 131 and the length of the bottom segment 111 to the maximum height. The maximum height is preferably the length of the vertical dimension of the dotted rectangle 128, which is the larger of two rectangles used in limiting the size adjustment (FIGS. 3a and 3b).

When adjustments are complete, the user may "save" the adjustments before exiting the adjustment program by selecting an icon (not shown) to command the host unit to record the adjusted setting of the screen control parameters in an "INI" file which is stored in the memory 17 or the hard disk of the host computer 11. Thus, each "saved" adjustment causes a change in the INI file and a related change in the shape of the image 100 displayed on the CRT 53. The user may also choose not to save the adjustments through a different command to the host unit. This command initiates a resetting of the screen control parameters in the controller chipset to their values prior to the adjustments made during the current adjustment session. This is performed by sending a signal from the host computer 11 to the monitor 13 to reset the control parameters to the values stored in the INI file, reflecting the cumulative adjustments made prior to the current session.

In the embodiment in which the VGA subsystem 33 transmits adjustment control signals via the DDC line 38, the bidirectional communication of the DDC line 38 may provide for automatic adjustments. The DDC line 38 may periodically transmit back the state of the adjustment screen control parameters to the host computer 11 to update the INI file. Alternatively, the DDC line 38 may transmit the state of the adjustment screen control parameters upon any changes. The visual characteristics of the graphical image 100 may then change in response to reflect the changes in the adjustment state.

As discussed above, FIGS. 3a through 9 illustrate how a technician can easily adjust a display according to its initial factory adjustment values by changing the size, shape, and orientation of the graphical image 100 so that it represents these initial factory adjustment values. Representing the cumulative adjustments to the display by the size, shape, orientation, and location with a single graphical image also simplifies adjustment procedures.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A display system having an adjustment state for each of a plurality of adjustment characteristics, at least one of the adjustment characteristics being an adjustment characteristic for size, the display system comprising:
   an image in a display having visual characteristics which are representative of the adjustment state for at least one of the adjustment characteristics, the image having a perimeter;
   a plurality of regions in the display associated with the image, each of the regions corresponding to one of the adjustment states;
   a cursor which is movable in the display in response to movements from a pointer device, the cursor having visual image;
   logic for detecting when the cursor is moved to a region in the display associated with a selected one of the adjustment characteristics;
   logic for detecting selection of the pointer device while the cursor is at a location in the region associated with the selected adjustment characteristic;
   logic for adjusting the display system according to the selected adjustment characteristic in response to a selection of the pointer device; and
   logic for expanding or contracting the image in response to detecting a selection of the pointer device while the cursor is stationary at a location separated from the image and in a region associated with an adjustment characteristic for size such that the perimeter of the image meets the cursor to indicate a change in the state of the adjustment characteristic for size.

2. The display system of claim 1, wherein the plurality of adjustment characteristics includes at least one of rotation, size, parallelism, centering, trapezoidism, bowing and symmetry.

3. The display system of claim 1, wherein the display system further includes a cathode ray tube responsive to video signals.

4. The display system of claim 3, wherein the cathode ray tube is disposed within a video monitor which receives adjustment signals from a host processor to change selected ones of the plurality of adjustment states.

5. A computer readable medium for use in conjunction with circuitry for adjusting a display system having an adjustment state for each of a plurality of adjustment characteristics, at least one of the adjustment characteristics being an adjustment characteristic for size, the computer readable medium having computer readable instructions encoded thereon for:
   placing an image on a display having visual characteristics which are representative of the adjustment state for at least one of the adjustment characteristics, the image having a perimeter;
   detecting when a cursor is moved to a region in the display associated with a selected one of the adjustment characteristics;
   detecting a selection of the pointer device while the cursor is at a location in the region associated with the selected adjustment characteristic;
   adjusting the display system according to the selected adjustment characteristic in response to a selection of the pointer device, and
   expanding or contracting the image in response to detecting a selection of the pointer device while the cursor is stationary at a location separated from the image and in a region associated with an adjustment characteristic for size such that the perimeter of the image meets the cursor to indicate a change in the state of the adjustment characteristic for size.

6. The computer readable medium of claim 5, the computer readable medium further including computer readable instructions encoded thereon for adjusting the display for at least one of rotation, size, parallelism, centering, trapezoidism, bowing and symmetry adjustment characteristics.

7. The computer readable medium of claim 5, the computer readable medium further including computer readable instructions encoded thereon for initiating a transmission of video signals to a cathode ray tube.

8. A method of adjusting a display system having an adjustment state for each of a plurality of adjustment characteristics, the method comprising:
   placing an image on the display having visual characteristics which are representative of the adjustment state for at least one of the adjustment characteristics;

detecting when a cursor is moved to a region in the display associated with a selected one of the adjustment characteristics;

detecting a selection of the pointer device while the cursor is at a location in the region associated with the selected adjustment characteristic;

adjusting the display system according to the selected adjustment characteristic in response to a selection of the pointer device; and expanding or contracting the image in response to detecting a selection of the pointer device while the cursor is stationary at a location separated from the image and in a region associated with an adjustment characteristic for size such that the perimeter of the image meets the cursor to indicate a change in the state of the adjustment characteristic for size.

9. The method of claim 8, the method further including adjusting the display for at least one of rotation, size, parallelism, centering, trapezoidism, bowing and symmetry adjustment characteristics.

10. The method of claim 8, the computer readable medium further including computer readable instructions encoded thereon for initiating a transmission of video signals to a cathode ray tube.

11. The display system of claim 1, the display system further comprising logic for affecting the visual appearance of the cursor upon detection that the cursor is in a region corresponding with a selected adjustment characteristic, the visual appearance being affected to indicate the selected adjustment characteristic.

12. The computer readable medium of claim 5, the computer readable medium further comprising computer readable instructions encoded thereon for affecting a visual appearance of the cursor upon detection that the cursor is in a region corresponding with a selected adjustment characteristic, the visual appearance being affected to indicate the selected adjustment characteristic.

13. The method of claim 8, the method further comprising affecting a visual appearance of the cursor upon detection that the cursor is in a region corresponding with a selected adjustment characteristic, the visual appearance being affected to indicate the selected adjustment characteristic.

* * * * *